United States Patent [19]

Hynecek

[11] Patent Number: 4,819,070
[45] Date of Patent: Apr. 4, 1989

[54] IMAGE SENSOR ARRAY
[75] Inventor: Jaroslav Hynecek, Richardson, Tex.
[73] Assignee: Texas Instruments Incorporated, Dallas, Tex.
[21] Appl. No.: 37,302
[22] Filed: Apr. 10, 1987
[51] Int. Cl.[4] ............................................. H04N 3/14
[52] U.S. Cl. ........................ 358/213.11; 358/213.22; 358/213.31
[58] Field of Search ...................... 358/213.11, 213.15, 358/213.22, 213.31, 213.12; 250/578

[56] References Cited
U.S. PATENT DOCUMENTS
4,380,755 4/1983 Endlicher et al. .............. 358/213.15

Primary Examiner—Michael L. Gellner
Assistant Examiner—David M. Gray
Attorney, Agent, or Firm—George L. Craig; Leo N. Heiting; Melvin Sharp

[57] ABSTRACT

An image sensor array (12) is comprised of a plurality of sensor elements (60) arranged in rows (62) and columns (64). Each element (60) is operable to modulate an output voltage signal responsive to charge accumulating in its gate region (70) responsive to incident light. Circuitry (74, 84, 78, 72) is provided to obtain and store a signal that is related to a threshold voltage differential produced by the accumulated charge, and not to the intrinsic threshold voltages or sizes of sensors (60). The array (12) has automatic blooming control, and can exhibit electronic iris, zooming and panning functions.

20 Claims, 3 Drawing Sheets

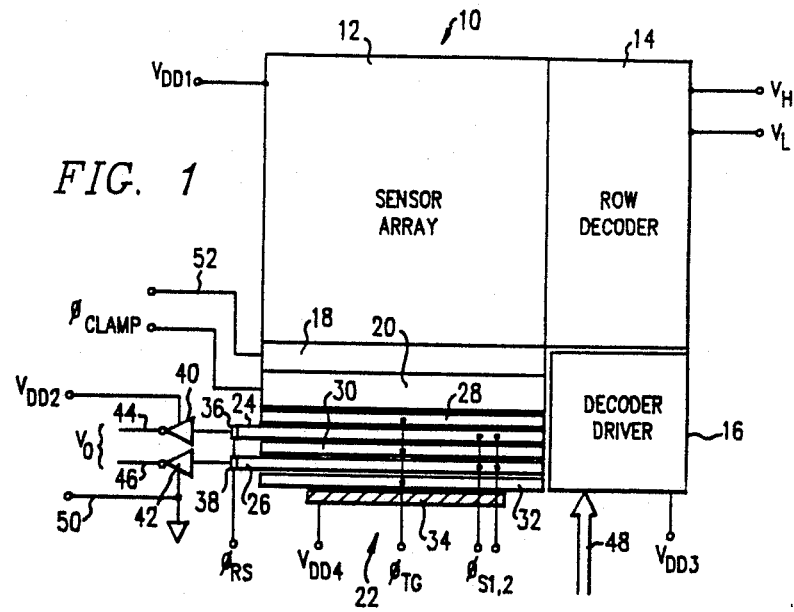
FIG. 1
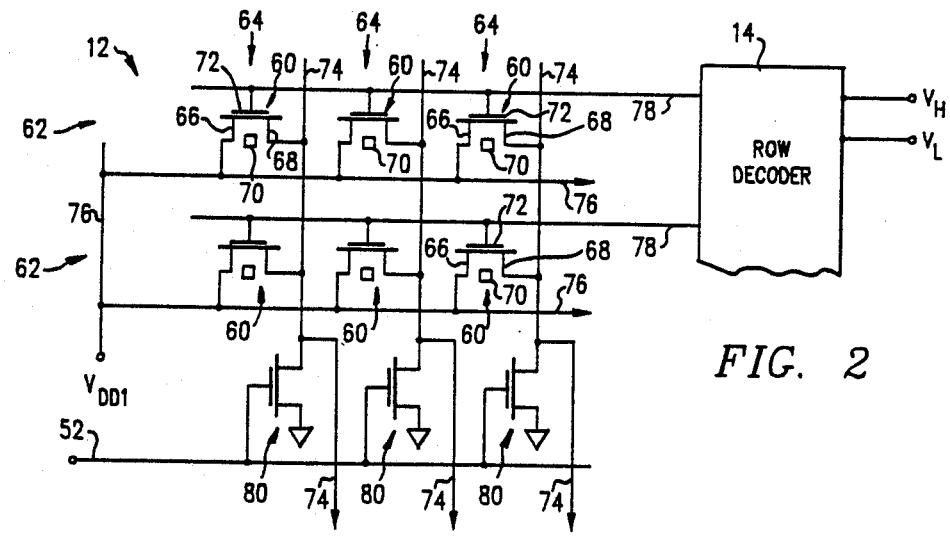
FIG. 2
FIG. 3

IMAGE SENSOR ARRAY

TECHNICAL FIELD OF THE INVENTION

This invention relates generally to image sensor arrays, and more particularly relates to line addressed, voltage signal modulating image sensor arrays with built-in blooming control, an electronic iris capability no measurable smear, and zooming and panning capabilities.

CROSS-REFERENCE TO RELATED APPLICATIONS

The present application incorporates by reference each of the following applications which are related cases having a common inventor and assignee and which contain related subject matter: Ser. No. 033,968, filed Apr. 2, 1987, pending Horizontal Scanner for Image Sensor Arrays; Ser. No. 034,306, filed Apr. 3, 1987, pending Floating Gate JFET Image Sensor; Ser. No. 036,617, filed Apr. 10, 1987, pending Bulk Charge Modulated Transistor and Method of Making Same.

BACKGROUND OF THE INVENTION

Several basic device architectures exist in the art for constructing image sensor arrays. Two of these are the frame transfer and line-address architectures. These architectures generally have a plurality of CCD elements arranged in rows and columns. For each CCD photosite well, an additional well separated by a barrier needs to be fabricated adjacent to the well for receiving the stored charge. Further, pixel density is decreased by the requirement of channel stops and well barriers. In certain of these devices, drains are formed in the channel stops to prevent blooming, and this occupies further array area.

Another class of imagers is arranged according to the interline transfer architecture. These devices comprise a plurality of photosites that can be either empty CCD wells or photodiodes. The photosites are separated by columns of CCD elements provided for readout of the signal. The necessity for the CCD columns decreases pixel density. Channel stops and barriers are required since CCD elements are used in the structure, and this further decreases pixel density.

Yet another class of devices uses an X-Y architecture, wherein each cell or element is individually addressed in the X and Y direction in order to read it out. Conventional X-Y architectures include charge injection devices (CIDs), MOS transistor devices and, more recently, charge-modulated transistor devices. In the CID device, two gates are formed, one connected to a column line, and another connected to a row line. CID arrays have long readout leads, and therefore, have a large parasitic capacitance. This in turn lowers the dynamic range of the device because of the kTC noise associated with the long, high-capacitance readout lines. Further, since each cell is required to be separately read out, the readout of an entire row of cells takes a considerable time. The high-density television (HDTV) format requires that the addressing and readout of an image sensor array used in connection therewith be done within a standard 53.5-microsecond period. Thus, if there are 1000 elements in a row of a CID array device that is operated in the HDTV format, each element in the row must be addressed and read out in 53.5 nanoseconds. This is very difficult to accomplish because of the RC time constant associated with charging up the readout lines, which in turn limits the size of CID image sensor arrays. Further, the relatively large time necessary to read out the array increases the opportunity for charge to leak from nonaddressed elements to addressed elements, thus causing smear.

MOS transistor arrays have the same problems as CID arrays relative to their long, large-capacitance sense lines. In addition, the charge from each address element is not amplified, but is instead read out directly on these sense lines. Pixel density of these device arrays is reduced by the requirement of forming either one or two transistors at each photosite for addressing purposes.

Recently, a charge modulated device has been proposed by T. Nakamura, K. Matsumoto et al. in their article "A New MOS Phototransistor Operating in a Non-Destructive Readout Mode," *Japanese Journal of Applied Physics*, Vol. 24, No. 5, pp. L323-325 (May, 1985). This proposed sensor array has the same X-Y architecture as the CID and MOS architectures mentioned above, and thus suffers the same dynamic range and speed problems as the other X-Y addressed architectures.

Variations in the manufacturing of these conventional image sensors produce an undesirable "pattern noise." The pixel density constraints and the architectural schemes conventionally described in connection with these devices do not allow sufficient flexibility for such operations as electronic zooming, panning, and automatic exposure control Given the necessity of small pixel size and relatively fast addressing and readout, the individual addressing of each element in a row having a large enough number of elements for good resolution has not been accomplished by conventional devices within the HDTV horizontal readout period.

Further, recently introduced charge modulated transistor elements modulate an output current, rather than a voltage. The signal current from these elements will vary both as a function of the element's size and its intrinsic threshold voltage. To reduce pattern noise from these two sources, it has been necessary to control element-to-element variations in these parameters to tolerances of one-half percent or better. Such tight control gets progressively more difficult as the pixel size decreases.

A need therefore exists in the industry for an image sensor array in which fabrication variations as to size, doping and threshold voltage among the sensor elements therein can be eliminated as a source of pattern noise. Further, a need in the industry has existed for a transistor image array architecture that will allow electronic zooming, panning and exposure control operations, and will be able to operate in high-density television applications. Finally, a need has arisen in the industry for an image sensor array having good blooming control and no measurable smear.

SUMMARY OF THE INVENTION

One aspect of the invention comprises an apparatus for sensing a voltage signal proportional to the number of photons of light incident on the sensor element in a selected charge integration period. The apparatus comprises a sensor element having an intrinsic threshold voltage. The sensor element accumulates charge responsive to light incident thereon, and is operable to exhibit a changed threshold voltage responsive to the accumulation of the charge. An output signal of the element varies as a function of the change in the threshold voltage. A sampler samples the output signal at a first time before the elimination of the charge from the element, and at a second time after the elimination of the charge. The sampler derives the change in the threshold voltage from these sampled output signals. A signal buffer comprising a register, such as a CCD register or an array of capacitors controlled by a horizontal scanner, is coupled to the sampler for storing a charge related to the derived voltage change. One of the advantages of the invention arises from its generation of a voltage signal rather than a current signal, whereby a source of pattern noise due to size and impurity variations in the sensor elements is minimized. A further advantage is gained from the fact that a voltage difference is sensed that does not depend on the intrinsic threshold of the element. Since variations in intrinsic threshold voltage from element to element are subtracted out in processing the signal, this source of pattern noise is minimized.

Another aspect of the invention comprises a transistor image sensor array. The array comprises a plurality of transistor image sensors arranged in at least one row and a plurality of columns. Each transistor has a gate region for accumulating charge responsive to light incident on the gate region. A column line for each column is connected to the sources of the sensor element or elements in that column. A row selector for each row of sensors is coupled to the gate regions in the row. The selector selects one of the rows for applying a pulse to the selected rows. A plurality of samplers are each coupled to respective column lines for sampling a voltage difference signal that varies as the change in output voltage of a selected sensor element on the respective column. The output change in the voltage difference signal is proportional to the charge accumulated due to incident light. A buffer is coupled to each of the columns for simultaneously receiving and storing the voltage difference signals from the samplers for the column lines. The parallel readout of all columns to a buffer provides an additional advantage in that time does not have to be spent in serially reading out each element in the row of the array. The delay due to the long column lines is thereby of little consequence. A voltage signal is thereafter serially output from the buffer, which is a much easier task since the long column lines are not involved.

The buffer in one embodiment comprises a pair of CCD registers. For each column, a voltage reference signal charge corresponding to a normal source voltage plus a voltage threshold differential of the selected image sensor element in that column is placed in a second CCD register, and a third signal charge corresponding to the normal source voltage without the threshold differential is placed in a first CCD register. The third signal and the reference signal are read out simultaneously, such that a voltage that is equal to the voltage threshold differential, and thus proportional to the number of charges accumulated in the addressed sensor, can be read out.

The buffer in another embodiment comprises an array of storage elements or capacitors coupled to respective column lines. A switching transistor for each storage capacitor is operable to couple the capacitor to an output sense line. Each switching transistor is operated by a respective sage of a horizontal scanner.

Another advantageous aspect of the invention comprises a method of operating the above array in a manner that allows electronic zooming and panning. For electronic zooming, the rows are encoded such that in the normal case every other row is addressed, rather than each adjacent row being addressed. In normal operation, the buffer, as embodied by a CCD register, is clocked at a first, high speed, and only every other pixel in the selected row is sampled at the output of the register. Alternatively, the clocking speed may be further increased and only one out of a multiple number of pixels may be sampled. When a zoom operation is called for, the clocking of the buffer decreases such that each pixel in a selected area is sampled at the output. The top and bottom limits of the zoomed portion of the array are defined by which lines are addressed, and the right and left limits are defined by a CCD register clock preshift and the time when the clock stops. The zoomed portion of the array may be panned from one location to another by changing which row lies are addressed, the amount of the buffer clock preshift, and the end of the clocking of the buffer.

Another embodiment of the invention replaces the CCD register with a plurality of storage capacitors, at least one of which is provided for each column, and a plurality of respective switching transistors that connect the storage capacitors to one or more output sense lines. The switching transistors are in turn controlled by a plurality of stages of a horizontal scanner. Each stage of the scanner is operable to receive an operating signal. This alternative readout means is adaptable to perform a zoom operation. Under normal conditions where a zoom operation is not called for, every other row of elements is selected by the row decoder. The row decoder may also be operated to skip several adjacent rows. The sensed voltage difference signals are stored on an array of storage capacitors. Every other storage capacitor may be read out by applying an operating signal sequentially to every other stage. The read out capacitors may alternatively be separated from each other by several, nonread capacitors.

When a zoom operation is called for, the row decoder will select every row within the zoomed portion, and the horizontal scanner will select every column in the zoomed portion. The zoomed portion may be panned from one location to the other simply by changing the row and column addresses.

Another aspect of the invention comprises electronic exposure control. Normally, each row line is addressed and sensed after an adjacent row line is addressed and sensed, such that the row line will accumulate charge until the entire array has been addressed and read out. This is in the case of noninterlaced operation or so called progressive scan. In the case of an interlaced scan, the situation is similar with the exception of reading (for example) odd lines in one field and even lines in the second field.

For electronic exposure control, a line may be first addressed and then reset after a predetermined time has elapsed to shorten the charge accumulation time. To do this, a row line reset address is selected that differs from the row line sensing address by a certain number of lines that is less than the number of lines in the entire array. The line to be reset is addressed within the same horizontal blanking period as the sensed line. However, the reset-addressed line only has a reset pulse applied to it, and the signal from it is not sensed. Therefore, the charge integration time available to each sensed line of sensors is reduced. Since the charge integration time for the array can be changed by changing the difference between the sensed line address and the reset line address, an "electronic iris" capability can be obtained that eliminates the requirement for a mechanical iris.

BRIEF DESCRIPTION OF THE DRAWINGS

The present invention and its advantages are more particularly pointed out in the following detailed description, taken in conjunction with the appended drawings in which:

FIG. 1 is a schematic plan view of an imager array according to the invention, showing one possible architectural layout;

FIG. 2 is a schematic electrical diagram of a small section of the sensor array shown in FIG. 1;

FIG. 3 is a schematic electrical diagram of an isolated image sensor element and the associated circuitry for processing the signal therefrom;

DETAILED DESCRIPTION OF THE INVENTION

Figure 3A:
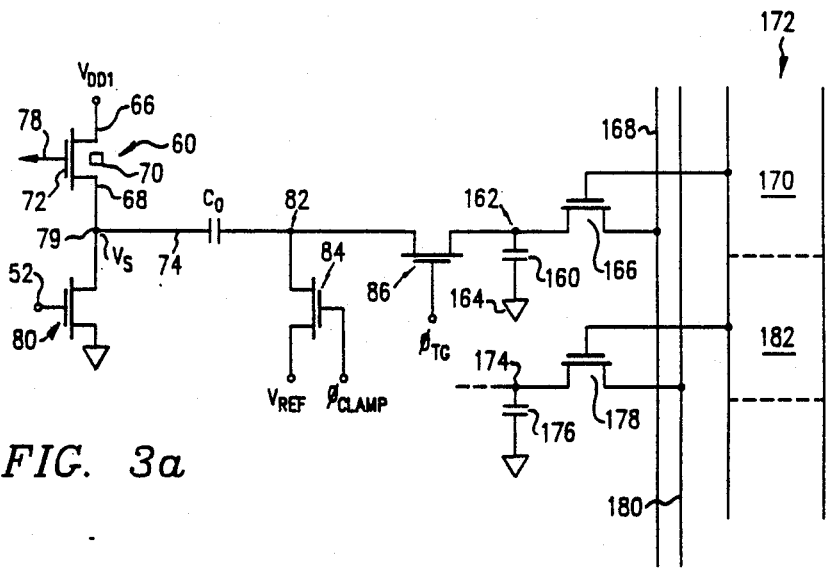
FIG. 3a is a schematic electrical diagram of an alternative embodiment of the invention, particularly showing readout circuitry comprising an array of storage capacitors and respective stages of a horizontal scanner.

Referring first to FIG. 1, a schematic plan view of an on-chip layout of the invention is illustrated. An imager is indicated generally at 10. Imager 10 comprises a sensor array 12 that takes up most of the chip area. A row decoder 14 is disposed on one side of array 12. Row decoder 14 is connected to a decoder driver 16.

A sense line bias switch area 18 is located on an adjacent side of array 12. A capacitor and clamp transistor area 20 is located in the illustrated embodiment adjacent to column line bias area 18. Column line bias area 18 may also be located on a side of array 12 opposite capacitor and clamp transistor area 20. An output buffer indicated generally at 22 is disposed adjacent the capacitor and clamp transistor area 20. In the embodiment in FIG. 1, buffer 22 is comprised of a pair of CCD registers 24 and 26. A first transfer gate area 28 is interposed between capacitor and clamping transistor area 20 and first CCD register area 24. A second transfer gate area 30 is interposed between CCD register 24 and CCD register 26. A third transfer gate area 32 is disposed between CCD register 26 and a drain area 34.

Reset gate areas 36 and 38 are respectively provided at output ends of CCD registers 24 and 26. Reset gate areas 36 and 38 are in turn connected to respective charge amplifiers 40 and 42. A differential voltage output $V_0$ is sensed across respective charge amplifier outputs 44 and 46.

Imager 10 is provided with a plurality of voltage supplies and signal inputs. A drain voltage supply $V_{DD1}$ supplies power to sensor array 12. In a similar manner, voltage supply $V_{DD2}$ supplies power to charge amplifiers 40 and 42. Voltage supply $V_{DD3}$ supplies power to the decoder driver 16. Voltage supply $V_{DD4}$ provides the drain bias for buffer 22.

Row decoder 14 is supplied with a high bias or pulse source $V_H$ and a low bias voltage source $V_L$. Decoder driver 16 may have a TTL input address bus 48, which in a preferred embodiment comprises nine address bit lines. Bus 48 may alternatively be replaced with a shift register wherein the nine address bits are shifted in serially and read out in parallel to driver 16. CCD registers 24 and 26 are provided with clocks $\phi_{S1}$ and $\phi_{S2}$. Transfer gate areas 28, 30 and 32 are provided with a transfer gate pulse source $\phi_{TG}$. Reset gates 36 and 38 are provided with a reset pulse source $\phi_{RS}$. Charge amplifiers 40 and 42 are provided with a ground source 50. Capacitor and clamping transistor area 20 is provided with a clamping pulse source $\phi_{clamp}$. Finally, column line bias area 18 is provided with a bias clock 52.

FIG. 1 illustrates only one possible topography of imager 10. In other embodiments, row decoder 14 can be duplicated and placed on the left side of sensor array 12 if it is desired to drive the address lines (described below) of array 12 from both sides. In yet another embodiment, row decoder 14 can be replaced by a vertical scanner composed of switches and a shift register. Further, as will be more particularly described in conjunction with FIG. 3a, CCD registers 24 and 28 and transfer gates 30 and 32 may be replaced with an array of storage capacitors and a horizontal scanner comprising a plurality of stages.

Referring now to FIG. 2, a small portion of sensor array 12 is schematically shown, together with certain peripheral circuitry. Sensor array 12 is comprised of a plurality of transistor sensor elements 60. A ray elements 60 are arranged in a plurality of rows 62 and columns 64. Array 12 can alternatively be comprised of only a single row of elements, as in the case of a line scanner. Array elements 60 each have a drain 66, a source 68, a gate region 70 and, in the illustrated embodiment, a gate 72. Gate 72 may be replaced with an equivalent capacitor (not shown) formed in each photosite over a portion of gate region 70. Each source 68 is connected to a column or sense line 74. A column line 74 is provided for each column 64 of sensor elements. Each drain 66 is connected to $V_{DD1}$ through a voltage supply line 76. Each gate 72 is connected to a row or address line 78. One row line 78 is provided for each row 62 of sensor elements. As noted above, only a small portion of sensor array 12 is shown. In one embodiment, array 12 is 980 pixels×1120 pixels, where each pixel or element 60 takes the shape of a hexagon and is approximately 5 microns×5.8 microns. Other shapes and sizes of elements are possible.

Sensor elements 60 are of the type that accumulate charge in gate region 70 responsive to incident light and change the threshold voltage of the element responsive to the accumulated charge. One type of threshold voltage-modulating sensor element may be fabricated as follows. A (N−) buried channel is implanted in a (P−) semiconductor layer. Two N+ regions are next formed to create drain 66 and source 68. The N+ regions making up source 68 and drain 66 are spaced by a P-type gate region 70. Gate region 70 is differentially doped in such a way as to create a potential well for the accumulation of holes responsive to incident light, and a potential well for an electron probing current. The hole potential well may be formed by an implant of boron. The probing current well may be formed by an implant using phosphorus. The element is formed in such a way that excess holes accumulated by the potential well can overflow to the substrate, providing automatic blooming control.

Each row or address line 78 is connected as an output of row decoder 14. As will be more particularly explained below, row decoder 14 connects one selected row address line 78 to source $V_H$, while connecting the remaining, unselected row lines 78 to low bias source $V_L$.

A column line bias transistor 80 is provided for each line 74. The drain of each transistor 80 is connected to column line 74. The gate of each transistor 80 is connected to column line bias source 52. The source of each transistor 80 is connected to ground or to a suitable return line such as $V_{ss}$. Each column sense line 74 continues on to be connected with a respective coupling capacitor CO (FIG. 3), and is coupled through circuitry to be described below to a respective element in CCD register 24. CCD register 24 is coupled by transfer gates 30 (FIG. 1) to the second CCD register 26, and registers 24 and 26 are operated together in a fashion to be explained below. Array 12 can therefore be read out in parallel into CCD registers 24 and 26, and the output will thereafter serially appear on charge amplifier outputs 44 and 46.

Referring now to FIG. 3, the sensing circuitry for one selected sensor element 60 will be described. Each sensor element 60 has a source 68 that is connected to a sense node 79. Sense node 79 is connected to both the current path of a sensing column bias transistor 80 and a coupling capacitor $C_0$. Capacitor $C_0$, which is physically located in capacitor and clamping transistor area 20 (FIG. 1), is in turn connected to a node 82. A clamping transistor 84 has a current path connected between node 82 and a voltage reference supply $V_{REF}$. The gate of clamping transistor 84 is controlled by a clamping clock $\phi_{clamp}$.

Node 82 is further connected to one end of the current path of a transfer gate transistor 86. Transfer gate transistor 86 has the other end of its current path connected to an input diode node 88 of first CCD register 24. The gate of transfer gate transistor 86 is controlled by a transfer gate clock $\phi_{TG}$. CCD register 24 is comprised of a plurality of gates. Only one set of gates 90 and 92 are shown corresponding to sense line 74, it being understood that at least two CCD wells are provided for each column 64 of array 12. A CCD gate clock controls a gate 92. Another gate clock $\phi_{S2}$ controls alternate gates 90. The described CCD register 24 is a two-phase CCD register, although other kinds of CCD registers, such as virtual-phase CCD registers, may be provided instead. Further, buffer 22 (FIG. 1) may be comprised of other storage and serial readout structures, such as an array of storage capacitors and one or more horizontal scanners, as will be described for FIG. 3a below.

Figure 4:
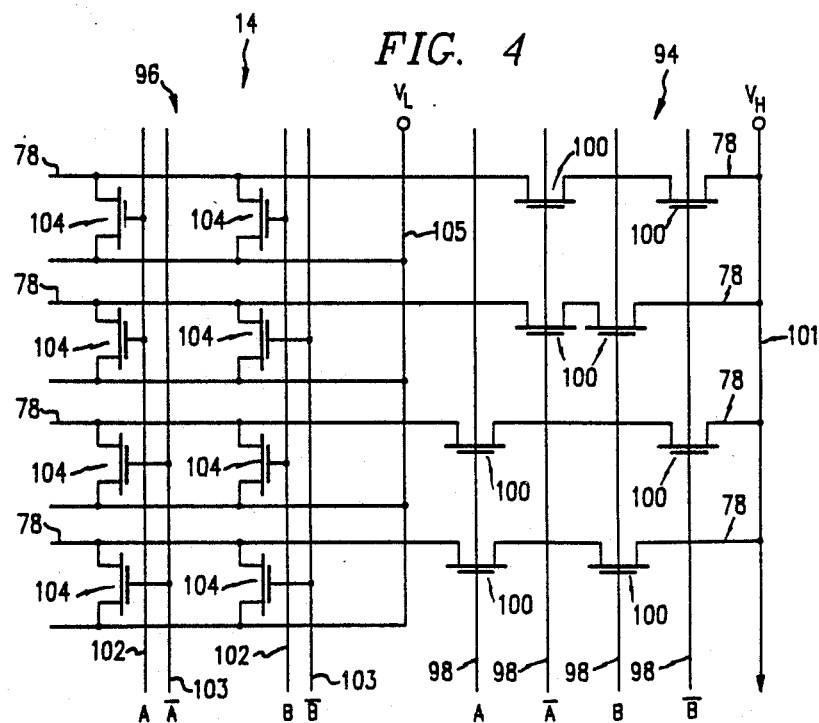
FIG. 4 is a schematic electrical diagram of a portion of a vertical decoder for the array shown in FIG. 1.

Referring now to FIG. 4, a schematic electrical diagram of a portion of row decoder 14 is illustrated. For purposes of clarity, only two bits of the 9-bit address used in the preferred embodiment are shown: a bit A and a bit B. Complement bits A and B are generated by decoder driver 16 from the code provided on address bus 48 (FIG. 1).

Decoder 14 comprises a first matrix 94 and a second matrix 96. Matrix 94 is formed by the intersection of row lines 78 with each of a plurality of bit lines 98 from row decoder 14. In order to decode the address carried on bit lines 98, decoding transistors 100 are formed at selected intersections of row lines 78 and bit lines 98. Each decoding transistor 100 has a current path formed in a respective row line 78, and a gate connected to a respective bit line 98. Each row line 78 is connected to a $V_H$ supply bus 101. Therefore, upon the receipt of the correct address, the transistors 100 in any one row line 78 will connect that row line with high bias voltage supply $V_H$. The remaining lines will be disconnected from $V_H$.

Matrix 96 is formed by the intersection of row lines 78 and bit lines 102 and 103. Bit lines 102 and 103 may be electrically connected to corresponding lines 98 or may be separately supplied from decoder driver 16 (FIG. 1). A plurality of decoding transistors 104 are formed at each intersection of a bit line 102 or its complement 103 and a respective row line 78. The drain of each decoding transistor 104 is connected to a $V_L$ supply bus 105. The gate of each transistor 104 is connected to either a bit line 102 for a true address bit or a bit line 103 for its complement. The gate connections of transistors 104 are chosen in such a way that matrix 96 will connect all nonselected row lines 78 to low bias array voltage bus 105. As will be explained below, the provision of row decoder 14 in place of a more conventional vertical scanner allows the advantages of easier implementation of electronic zooming, panning and automatic exposure control.

Figure 5:
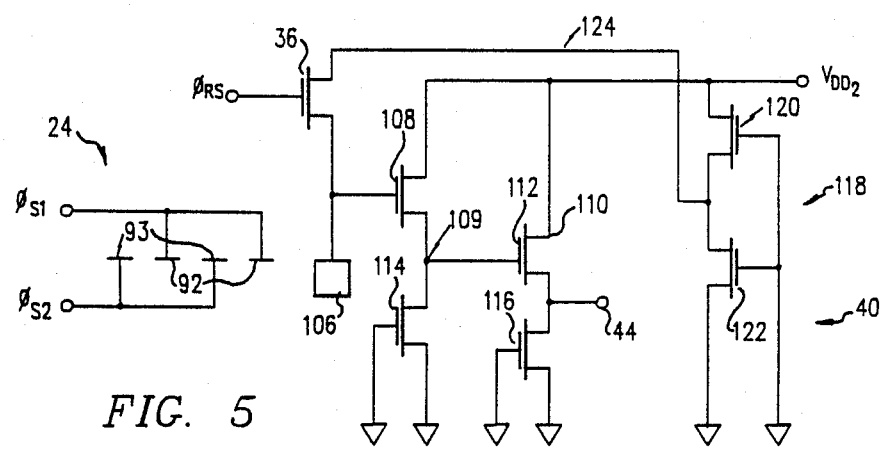
FIG. 5 is a schematic electrical diagram of a charge amplifier for the CCD shift register shown in FIG. 1.

Referring now to FIG. 5, a schematic electrical diagram for charge amplifier 40 is illustrated. The circuitry illustrated is duplicated for charge amplifier 42 (FIG. 1). CCD register 24 comprises a series of wells controlled by $\phi_{S1}$ gates 92 and $\phi_{S2}$ gates 93. CCD register 24 terminates in a standard floating diffusion detection node 106. This detection node and the size of transistor 108 are optimized for the best signal-to-noise ratio. The detection node 106 is connected to the current path of reset gate transistor 36, and is also connected to the gate of a buried channel transistor 108. The current path of transistor 108 leads from the voltage supply $V_{DD2}$ to a node 109, which in turn is connected to the gate of a surface channel transistor 112. The current path of surface channel transistor 112 leads from the voltage source $V_{DD2}$ to an output terminal 44. Thus, the signal proportionate to the charge detected at node 106 is buffered by a two-stage source follower arrangement and will be output at detection node 44. Transistors 114 and 116 are of the buried channel type, and thus act as current sources to provide a bias for transistors 108 and 112.

The current path of reset transistor 36 is connected by a line 124 to a reference generator indicated generally at 118. Reference generator 118 includes a transistor 120 and a transistor 122, which may conveniently use or include the same doping concentrations used in the construction of CCD register 24, and whose current paths are connected in series. Line 124 is connected to a midpoint between the current paths of transistors 120 and 122, and connects this midpoint to the current path of reset transistor 36. The drain of transistor 120 is connected to voltage source $V_{DD2}$ while the source of transistor 122 is connected to ground. The gates of transistors 120 and 122 are also grounded, or can be connected to a reference supply. The source of transistor 122 and the gates of transistors 120 and 122 can be alternatively connected to a suitable $V_{ss}$ return line.

Figure 6:
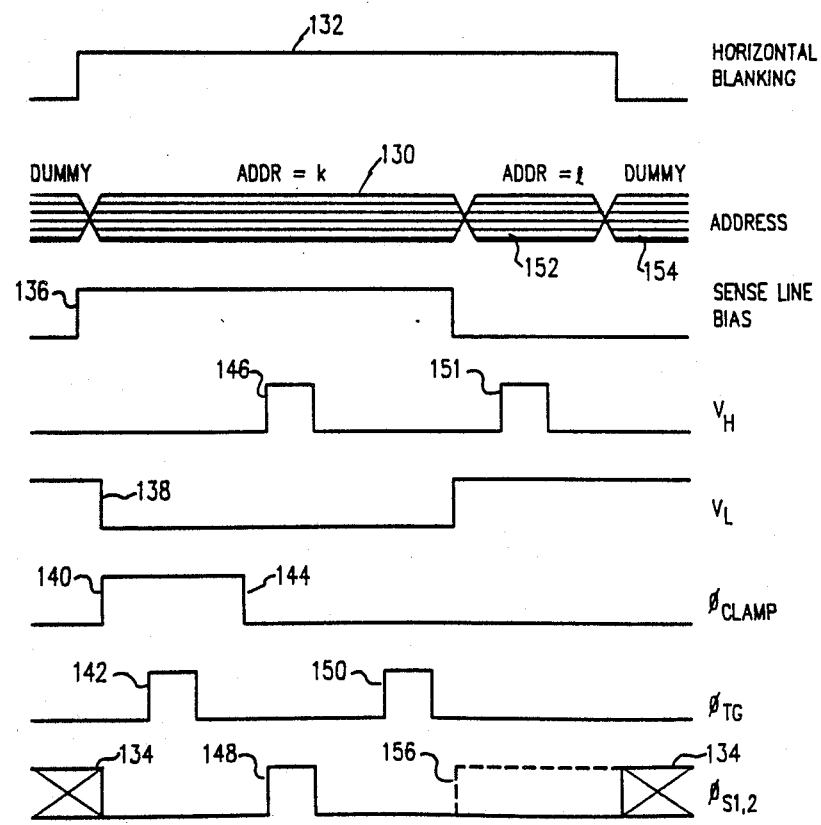
FIG. 6 is a timing diagram for the operation of the array illustrated in FIGS. 1, 2 and 3.

Referring to FIG. 6 in conjunction with FIGS. 1 and 3, the operation of imager 10 will be described. FIG. 6 illustrates a timing diagram for the operation of imager 10. An address is fed in on bus 48 to decoder driver 16. Decoder driver 16 in turn supplies the address on bit lines 98, 102 and 103 (FIG. 4) to row decoder 14. Row decoder 14 selects one particular row line 78 for connection to $V_H$, and connects the remaining row lines 78 to supply $V_L$. $V_L$ is connected to nonselected rows and pulsed in order to reduce signal interference therefrom. The addressing of row line 78 is shown at 130 in FIG. 6. The selected row line has an assigned number k.

The addressing of the selected row line 78 occurs within a horizontal blanking period 132, which is approximately 10 microseconds for both standard NTSC TV system and high-density television (HDTV) applications. Horizontal blanking period 132 alternates with a horizontal readout period, indicated at 134 on the $\phi_{S1,2}$ graph. At the start of horizontal blanking period 132, the sense line bias transistors 80 (FIG. 3) for all columns 64 are turned on at 136 (FIG. 6). The sense line bias transistors 80 had been turned off in order to save power. At or near this time, decoder 14 finishes connecting $V_L$ to all of the nonselected lines at 138 (FIG. 6), disabling any signal interference which may occur from the nonselected rows of elements 60. Blooming control is disabled on the nonselected rows at the same time, but the period is so short that no signal interference is expected. Clamping transistor 84 is turned on by a $\phi_{clamp}$ pulse at 140. This establishes a reference voltage at node 82 on the right side or electrode of capacitor $C_0$ (FIG. 3) The voltage at node 79 to the left of capacitor $C_0$ will at this time be substantially equivalent to $V_s + V_h$, where $V_s$ is the voltage normally present at source 68 of the sensor element as biased by transistor 80 (FIG. 3) and $V_h$ is a differential threshold voltage component caused by holes accumulated in the gate region hole well responsive to incident light. The voltage of node 79 will equal the voltage at source 68 after a few RC time constants of line 74 (FIG. 3).

While $\phi_{clamp}$ is applied, the voltage on the right side of capacitor $C_0$ a node 82 is set to $V_{REF}$, which is preferably chosen as about 5 volts. In the embodiment shown in FIG. 3, $V_{REF}$ should be chosen to be compatible with being read into CCD register 24 (FIG. 3) In an alternate embodiment, $V_{REF}$ should be compatible with the storage capacitor circuits if they are used. The reference voltage $V_{REF}$ is put into the input node 88 of CCD register 24 by pulsing transfer gate 86 at time 142 (FIG. 6). After the reference signal has been transferred into the CCD register 24, transfer gate 86 is turned off and node 82 is unclamped at time 144. Other timing sequences are also possible, for example, the clamp pulse can occur entirely before the transfer pulse This disconnects capacitor $C_0$ from voltage reference $V_{REF}$. The voltage at node 82 is now allowed to float.

Next, the hole potential well in gate region 70 is emptied by pulsing the $V_H$ array bias high at time 146. At the same time, a CCD register clock $\phi_{S2}$ is pulsed at 148 in order to prepare a transfer of the charge corresponding to the voltage reference signal to second CCD register 26 (FIG. 1) which will occur at time 150. CCD register 26 has a structure similar to CCD register 24, and is provided in order to store the charges corresponding to the voltage reference signals of the selected row of elements. CCD register 24 is provided to store the charges corresponding to the voltage difference signals.

By emptying the holes out of the potential well in gate region 70, a voltage signal will appear at node 79 that is substantially equivalent to $V_s$, the $V_h$ component having been eliminated responsive to sweeping out the holes. Since the voltage at node 79 has dropped by $V_h$, the floating right side of capacitor $C_0$ will correspondingly be driven to $V_{REF} - V_h$. This voltage difference signal is transferred to the input of CCD register 24 through transfer gate 86 by means of a transfer gate pulse 150. At the same time, the charge corresponding to the voltage reference signal is transferred to the second CCD register. In this manner, a voltage difference signal ($V_h$) can be derived that varies directly with the photons accumulated by gate region 70 within a preselected integration period. The voltage difference signal will be unrelated to the intrinsic threshold voltage $V_t$ of sensor element 60. Variations in $V_t$ or physical size from sensor to sensor are therefore avoided as sources of pattern noise. Similarly, since the charge corresponding to the voltage reference signal and a charge corresponding to the voltage difference signal are processed through the same circuitry, other sources of pattern noise such as input well size variations, are avoided as well.

The transfer of signal voltage ($V_{REF} - V_h$) to the inputs of register 24 completes the basic signal transfer sequence from array 12 into serial registers 24 and 26. Referring to FIGS. 1 and 2, this sensing and transfer process occurs simultaneously for all columns 64 of sensor elements 60, thus filling the respective wells of CCD registers 24 and 26 all along their lengths. When the horizontal readout phase 134 (FIG. 6) starts, the charges corresponding to the signal and reference voltages stored by CCD registers 24 and 26 are read out through charge amplifiers 40 and 42 to outputs 44 and 46. A differential voltage signal equivalent to $-V_h$ for each well can be determined by comparing output 44 to output 46.

The parallel readout scheme provided by the invention has the important advantage of allowing individual sensor elements to be read out without significant signal interference from unaddressed rows, since an entire row is read into buffer 22 (FIG. 1) in parallel in a very short time. Conventionally, X-Y image sensor arrays are read out element by element, instead of row by row. The architecture of the invention allows more time for addressing and readout and is therefore more suitable for HDTV (high density television) applications, since the parallel readout is independent of number of elements in the row.

Referring now to FIG. 3a, an alternative embodiment of the invention is shown, wherein CCD register 24 (FIG. 3) is replaced by an array of storage capacitors and associated stages of a horizontal scanner. As before, coupling capacitor $C_0$ will produce a voltage difference signal at node 82. A transfer gate 86 is operable to transfer this signal to a storage capacitor 160. Storage capacitor 160 is connected between a node 162 and a voltage reference 164. Node 162 is connected through a current path of a switching transistor 166 to a first output line 168. The gate of transistor 166 is connected to a stage 170 of a horizontal scanner indicated generally at 172. In the embodiment shown, the sensor elements of an adjacent column are coupled to a node 174 which is connected to a storage capacitor 176 for that column. Node 174 is connected through the current path of a switching transistor 178 to a second output line 180. The gate of second switching transistor 178 is connected to a second stage 182 of horizontal scanner 172.

In operation, a row line 78 selects a row of elements 60. A voltage difference signal from each selected element is simultaneously transferred to capacitors 160, 176, etc. through the operation of a plurality of transfer gates such as transfer gate 86. The charges stored on storage capacitors 160, 176, etc. may then be serially transferred out to output lines 168 and 180 through the operation of switching transistors 166, 178, etc. These gates are respectively controlled by preferably adjacent stages 170, 182, etc. of horizontal scanner 172. In one embodiment, an operating signal (not shown) is propagated through successive stages 170 and 182, operating switching transistors 166, 178, etc. in succession. In another embodiment, this operating signal (not shown) can be randomly input into any selected stage 170, 182, etc., thereby selecting which storage capacitors 160, 176, etc. will be read out and in which order.

With the embodiment shown in FIG. 3a electronic zooming and panning operations are relatively easily accomplished. The addresses of selective rows within a zoomed section can be selected by the row decoder, and the addresses of the columns to be read out in the zoomed portion can be selected by addressing selected ones of the horizontal stages 170, 182, etc. A panning operation can be achieved merely by changing the addresses of the addressed rows and columns.

Because one row of elements can be addressed and stored by the CCD register of FIGS. 3 and 5 within one standard 10 microsecond TV horizontal blanking period, the architecture of the invention allows an "electronic iris" or automatic exposure control as well as electronic zooming and panning. The electronic automatic exposure control feature of the invention will be described first. In normal operation, each row 62 of sensor elements 60 (FIG. 2) is sequentially addressed and read out. Then, the remaining rows 62 are addressed and read out before the first row is again selected. The charge integration time for any one row of elements is therefore equivalent to the total number of rows in the array times the time for which each row is addressed and read out.

If the charge accumulation time in each gate region 70 is reduced, an automatic exposure control or "electronic iris" will in effect be provided. If a reset pulse 151 (FIG. 6) is impressed on gate 72 (FIG. 3) at an earlier time, there will be less opportunity for charge to be accumulated responsive to incident light.

One way to do this is to select a second addressed row line at 152 (address 1) within the same horizontal blanking period, where address 1 is a number of lines removed from address k. A reset pulse 153 is applied to all gate regions 70 in row 1, but no resulting voltage difference signals are transferred to registers 24 or 26 for this row. If there are, for example, 525 lines, and the normal address and readout period for one row is t, the normal charge accumulation time will be 525t and will correspond to a wide-open mechanical iris. If, on the other hand, an additional address 1 is chosen that is spaced by a number of row lines from address k, the new integration time will be (525−(k−1))t. This will give a correspondingly shorter integration time, and corresponds to a mechanical iris being partially closed.

The architecture of the invention is suitable for automatic exposure control. This is because the structure of each photosite is such that it can be reset at any time, and all manipulation of the readout signal occurs in the horizontal blanking period rather than in the readout period.

Returning to FIG. 6, the column lines are switched to a dummy row address 154 which is used to provide a suitable bias for the sensor elements during the readout period.

The invention may also be employed in a scheme that permits electronic zooming and panning. The array element 60 (FIG. 3) of the invention is relatively small compared to conventional pixels, and may thus have a density that is at least twice that of conventional sensor element densities. Where imager 10 is used in a system that can be activated for electronic zooming, only every other line 78 (FIG. 2) can be normally addressed for readout, or alternatively several lines can be skipped. Only every other pixel or element 60, or alternatively one of each n pixels, is sampled at outputs 44 and 46 for any one particular row 78. No degradation of image results, since the density of imager array 12 is at least twice normal. In the normal operation mode in this scheme, decoder 14 (FIGS. 1 and 4) will select every other row 78 rather than each row 78 for addressing and readout, or every third row if a progressive scan is used. Only every other pixel in the selected row will be sampled at outputs 44 and 46.

When zooming is desired, the address selection performed by row decoder 14 and the readout clocks $\phi_{S1,2}$ is changed. For example, let us suppose that it is desired to read out only an upper left quarter of sensor array 12, rather than the array in its entirety. In order to prevent any loss in resolution, each row line 78 within the selected subarea is addressed, rather than every other row line. Similarly, in order to pick up every pixel in the addressed row line, clocks $\phi_{S1,2}$ are slowed down to one-half of their non-zooming frequency in order to sample the signal and reference voltages from each pixel in the selected row.

The top and bottom of the zoom area are chosen by the selection only of row lines 78 within the desired magnified area. The left side of the zoomed area is defined chosen by a CCD register clock preshift shown at 156 in FIG. 6. The preshift begins activating the CCD register readout during the horizontal blanking period, and dumps information for a predetermined number of wells in the selected row onto the output node of the CCD register before the actual horizontal readout phase begins. The right side of the magnified area can be chosen by stopping the readout clocks $\phi_{S1,2}$. In this manner, the number of columns that are read out can be limited. The unused charges stored in registers 24 and 26 will be automatically transferred to drain region 34 (FIG. 1) during the next horizontal blanking period.

Since vertical decoder 14 allows a random access to row lines 78, the zoomed section can be panned in a vertical direction by changing the selected row lines 78. The zoomed section can be panned in the horizontal direction by changing the clock preshift period and the total period for which registers 24 and 26 are clocked out.

In summary, an image sensor array has been provided that senses and stores signals varying as modulated threshold voltages of the addressed sensor elements. A method and apparatus has been described that eliminates intrinsic threshold voltage and other fabrication variations as sources of pattern noise. Further, the array of the invention allows considerable flexibility over conventional X-Y address image arrays, allowing such functions as automatic exposure control, electronic zooming and electronic panning. Since the voltage difference signals are read into a register in parallel from the array very quickly, a cause of smear is minimized.

While preferred embodiments of the invention and their advantages have been described above, the invention is not limited thereto but only by the spirit and scope of the claims which follow.

TECHNICAL ADVANTAGES OF THE INVENTION

One advantage of the invention is provided by a sensor array whose elements modulate threshold voltage rather than current. Sources of pattern noise due to intrinsic threshold voltage variations and other fabrication variations are minimized by sensing and storing a signal that is related only to the charge accumulated in the potential well of each sensor element A further advantage of the invention is obtained by the use of a vertical decoder or shift register This allows random access of the address row lines, which in turn allows the array to exhibit automatic exposure control, electronic zooming and electronic panning. The architecture of the invention provides a further advantage in that the time necessary for the address and readout of any one row of elements is independent of the number of elements in a row, since the readout is done in parallel The architecture of the invention is therefore better suited for high-density television (HDTV) applications. The invention further minimizes smear by its use of a parallel readout of the voltage difference signals into a register.

What is claimed is:

1. A transistor image sensor array, comprising:
   a plurality of transistor image sensors arranged in at least one row and a plurality of columns, each transistor sensor having a gate region for accumulating charge responsive to light incident thereon, and a drain connected to a voltage supply, a voltage threshold of each gate region operable to change according to the amount of accumulated charge;
   each sensor further having a source region, a column line for each column coupled to said source regions in said column;
   a decoder operable to address said at least one row responsive to a received row line address by applying a predetermined pulse to said at least one row, said pulse operable to remove said accumulated charge from each gate region in the row, a normal source voltage of each transistor in the row provided by a bias source coupled to each said source region, the source voltage of each sensor in the row returning to said normal source voltage responsive to the removal of said accumulated charge in a respective gate region;
   a decoder driver for generating a binary address having a plurality of address bits each address bit output from said decoder driver on a respective bit line;
   a first matrix formed in said decoder from said bit lines and row lines connected to respective ones of said rows, said matrix operable to connect a pulse source to a selected one of said row lines, transistors formed at selected ones of intersections of said bit lines with said row lines, a gate of each said transistor coupled to a respective bit line, a current path of each said transistor formed in a respective row line, one terminal of each said row lines connected to said pulse source;
   a plurality of samplers each coupled to a respective column line for sampling and storing a voltage difference signal proportional to the charge in source voltage of a selected sensor in said column due to a changed threshold voltage of said sensor;
   a storage means coupled to said columns for simultaneously receiving and storing said voltage difference signal from each said sampler;
   an output for serially outputting each said voltage difference signal from said storage means,
   a reference voltage selectively coupled to a respective sampler and used to acquire said voltage difference signal, a first register of said storage means for storing a charge proportional to said voltage difference signal, a second register of said storage means for storing a charge proportional to said reference voltage for each sampler; and
   a second output for serially outputting said stored reference voltages.

2. The array of claim 1, wherein said decoder further comprises:
   a second matrix formed in said decoder from said row lines and said bit lines for connecting a low array bias source to nonselected ones of said row lines, second transistors formed at selected ones of intersections of said bit lines and said row lines, a gate of each said second transistor coupled to a respective bit line, a current path of each said second transistor connecting said row line with the low array bias source.

3. The array of claim 1, wherein said decoder comprises a vertical shift register.

4. The array of claim 1, wherein said storage means comprises a plurality of storage capacitors each coupled to a respective column line for storing a respective voltage difference signal;
   at least one output sense line, a sense line switch for each column operable to couple said storage capacitor for said column to said at least one sense lie; and
   a horizontal scanner having a plurality of stages each stage operable to close a respective sense line switch responsive to recovery an operating signal.

5. Apparatus for sensing a voltage difference signal proportional to the number of photons accumulated during a selected integration time comprising:
   a sensor element having a gate accumulating charge responsive to incident light, a source coupled to a source of bias voltage and a drain coupled to a supply voltage;
   a reset source selectively coupled to said gate for periodically eliminating the accumulated charge, said element producing an output signal at the source varying as a charge in threshold voltage of said element;
   a sampling capacitor having a first side receiving said output signal and a second side selectively coupled to said buffer;
   a clamping transistor having a gate and a current path, the current path of said clamping transistor selectively coupling a reference voltage source to said buffer and said second side of said capacitor at said first time, said second side of said capacitor allowed to float after said first time and to provide a voltage difference signal proportional to the charge between the threshold voltage and the reference voltage signal to said buffer, said voltage difference signal stored in said buffer at said second time; and
   a clamp pulse source coupled to the gate of said clamping transistor, said clamp pulse source activating said clamping transistor at said first time.

6. The apparatus of claim 5, further comprising a transfer gate operable to transmit said voltage reference and said voltage difference signal from said capacitor to said buffer.

7. The apparatus of claim 5, wherein the output signal at said first time is equal to said source voltage plus said change in threshold voltage created by said accumulated charge; and the output signal at said second time is equal to said source voltage alone.

8. The apparatus of claim 5, wherein said buffer comprises a CAD register.

9. The apparatus of claim 5, wherein said buffer comprises a storage capacitor.

10. A method for sensing a voltage signal proportional to light incident on a sensor element having a gate, source and drain within a preselected integration period comprising:

accumulating charge on said gate responsive to the light incident on the sensor element;

changing the threshold voltage of the sensor element responsive to the accumulated charge;

transmitting an output signal from the source of said sensor element that varies as the change in the threshold voltage;

sampling the output signal at a first time;

eliminating the accumulated charge from the sensor element after the first time;

sampling the output signal at a second time after the elimination of said charge;

deriving a change in threshold voltage from said sampled output signal; and storing a voltage difference signal varying as the change in threshold voltage.

11. The method of claim 10, and further including the steps of:

outputting from the sensor element a first output signal equal to a normal source voltage impressed on the element plus a threshold voltage differential created by the accumulated charge on said gate;

impressing the first output signal on a first electrode of a capacitor at the first time;

impressing a voltage reference on a second electrode of the capacitor at the first time;

transferring a charge proportional to the voltage reference to a buffer at the first time;

outputting from the sensor element at the second time a second output signal equal to the normal source voltage without the threshold voltage differential;

impressing the second output signal on the first electrode of the capacitor at the second time;

varying the voltage on the second electrode at the second time away from the voltage reference to said voltage difference signal responsive to impressing the second output signal on the first electrode; and transferring a charge proportional to the voltage difference signal to the buffer.

12. The method of claim 11, wherein the voltage difference signal equals the reference voltage minus the threshold voltage differential.

13. A method for detecting an image with an array of transistor image sensors arranged in rows and columns, comprising the steps of:

selecting a row of image sensors;

accumulating charge in a gate of each sensor in the selected row responsive to incident light;

changing the threshold voltage of each sensor in the row responsive to said accumulated charge in said gate;

sensing a first voltage signal at a source of each said transistor image sensor in said row that varies as a function of the change in said threshold voltage;

storing a reference signal for each sensor in transferring the reference signal to a buffer;

eliminating said accumulated charge;

sensing a second voltage signal at the source of each transistor that differs from the first voltage signal by a threshold voltage differential caused by the accumulated charge;

forming a voltage difference signal for each sensor that differs from the reference signal by a respective threshold voltage differential;

for each sensor in said row, transferring the voltage difference signal to the buffer; and reading out from said buffer a voltage difference signal and a respective reference signal for each sensor in the selected row.

14. The method of claim 13, and further including the steps of:

transferring the voltage difference signal for each sensor to a first register of the buffer;

transferring the reference signal for each sensor to a second register of the buffer;

serially reading out of the first register the voltage difference signal for each sensor; and serially reading out the reference signal for each sensor out of the second register simultaneously with serially reading out the respective voltage difference signal from the register.

15. The method of claim 14, and further comprising the steps of:

after sensing a first voltage signal from each sensor, pulsing a gate of each sensor in order to eliminate said accumulated charge;

initially transferring the reference signal to the first register at the time the first voltage signal is served; and transferring the reference signal for each sensor from the first register to the second register at the time that said sensor is pulsed.

16. The method of claim 13, and further including the steps of:

connecting a first array bias source to the selected row of transistor image sensors;

pulsing the gates of the sensors with the first array bias in order to eliminate said accumulated charge; and connecting each nonselected row of image sensors to a second array bias source in order to prevent signal interference from the nonselected rows.

17. The method of claim 13, and further comprising the steps of:

sensing and storing the voltage difference signals and the reference signals during a horizontal blanking period; and serially reading out the voltage difference signals during a horizontal readout period subsequent to said horizontal blanking period.

18. The method of claim 13, wherein each row of image sensors is selectable with an address, adjacent rows having numerically adjacent addresses, each row of sensors to be addressed and sensed being addressed during a respective horizontal blanking period, the method including the steps of:

addressing a first row of sensors during a horizontal blanking period;

sensing and storing a reference signal and a voltage difference signal for each sensor in the first row;

changing the address to a reset address for a second row of image sensors during the same horizontal blanking period;

eliminating charge accumulated in each sensor in the second row without transferring any signal therefrom to the buffer; and determining a charge integration time for the sensors of the array based on the total number of rows in the array minus the difference in addresses between the first row and the second row.

19. The method of claim 13, wherein the buffer is serially read out according to a clock and the buffer comprises a plurality of stages equal to the number of columns, the rows being randomly selectable by a row decoder, the method including the further steps of:

providing a number of rows and columns of image sensors that is at least twice the number of rows and columns necessary for the desired level of resolution;

normally storing, for each selected row, the voltage difference signals during a respective horizontal blanking period;

normally reading out each selected row of voltage difference signals during a respective horizontal readout period next following the horizontal blanking period;

obtaining a normal image by serially selecting every other row of image sensors and by clocking the buffer for serial readout at a first speed such that every pixel in the selected row is sampled;

zooming to detect a selected magnified portion of the incident image using the following steps:

selecting each successive row of image sensors;

beginning to clock the register for serial readout during the horizontal blanking period in order not to read, during the next following horizontal readout period, those pixels connected to columns of sensors that are not in the zoomed portion;

stopping the readout clock after the pixels corresponding to columns within the magnified portion have been read; and slowing down the buffer readout clock to a speed equal to one-half the first speed in order to sample each pixel coupled to a column in the magnified portion.

20. The method of claim 19, and further including the operation of panning, comprising the following steps:

displacing the magnified portion by a number of horizontal rows by changing an addressing code of the rows to be selected; and changing which columns of sensors are to be read by changing the time at which the readout clock begins to operate during the horizontal blanking period, and by changing the time at which the readout clock stops.

* * * * *